(12) United States Patent
Nakanishi (10) Patent No.: US 9,231,269 B2
(45) Date of Patent: Jan. 5, 2016

(54) NON-AQUEOUS ELECTROLYTE AIR BATTERY

(75) Inventor: Shinji Nakanishi, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 173 days.

(21) Appl. No.: 13/985,432

(22) PCT Filed: Feb. 22, 2011

(86) PCT No.: PCT/JP2011/053834
§ 371 (c)(1),
(2), (4) Date: Sep. 9, 2013

(87) PCT Pub. No.: WO2012/114453
PCT Pub. Date: Aug. 30, 2012

(65) Prior Publication Data
US 2014/0004429 A1    Jan. 2, 2014

(51) Int. Cl.
*H01M 8/22* (2006.01)
*H01M 12/08* (2006.01)

(52) U.S. Cl.
CPC ............... *H01M 8/22* (2013.01); *H01M 12/08* (2013.01); *H01M 2300/0045* (2013.01)

(58) Field of Classification Search
None
See application file for complete search history.

(56) References Cited

U.S. PATENT DOCUMENTS

| | | | |
|---|---|---|---|
| 2001/0053472 A1* | 12/2001 | Edlund | 429/46 |
| 2009/0169992 A1* | 7/2009 | Ishiko et al. | 429/188 |
| 2011/0183205 A1* | 7/2011 | Graczyk et al. | 429/218.1 |
| 2012/0323004 A1* | 12/2012 | Friesen et al. | 544/161 |

FOREIGN PATENT DOCUMENTS

| | | |
|---|---|---|
| CN | 101379653 A | 3/2009 |
| JP | A-2004-119278 | 4/2004 |
| JP | A-2005-116317 | 4/2005 |
| JP | A-2006-286414 | 10/2006 |
| JP | A-2007-207675 | 8/2007 |
| JP | A-2009-230985 | 10/2009 |
| JP | A-2010-287414 | 12/2010 |

OTHER PUBLICATIONS

Tsunashima et al., Low viscous and highly conductive phosphonium ionic liquids based on bis(fluorosulfonyl)amide anion as potential electrolytes, Available online Dec. 13, 2010, Electrochemistry Communications 13 (2011) 178-181.*
Tsunashima et al., Low viscous and highly conductive phosphonium ionic liquids based on bis(fluorosulfonyl)amide anion as potential electrolytes, Available online Dec. 13, 201 O, Electrochemistry Communications 13 (2011) 178-181.*

* cited by examiner

*Primary Examiner* — Patrick Ryan
*Assistant Examiner* — Jose Colucci Rios
(74) *Attorney, Agent, or Firm* — Oliff PLC (57) ABSTRACT

An object of the present invention is to provide a non-aqueous electrolyte air battery with large discharge capacity and excellent rate characteristics. Disclosed is a non-aqueous electrolyte air battery including an air cathode, an anode and a non-aqueous electrolyte present between the air cathode and anode, wherein the non-aqueous electrolyte includes an ionic liquid as the solvent, the ionic liquid including bis (fluorosulfonyl)amide as the anion portion.

1 Claim, 2 Drawing Sheets

NON-AQUEOUS ELECTROLYTE AIR BATTERY

TECHNICAL FIELD

The present invention relates to a non-aqueous electrolyte air battery with excellent discharge capacity.

BACKGROUND ART

Air batteries typified by a lithium air battery are batteries which uses oxygen as the cathode active material to discharge. The basic structure of air batteries comprises an anode, an air cathode (cathode) and an electrolyte present between the anode and air cathode. The cathode active material, oxygen, is obtained from the air and is not needed to be encapsulated in the battery. Therefore, air batteries can increase the anode active material amount per unit volume larger than batteries in which the cathode active material in solid form is encapsulated. Accordingly, air batteries have large electrical capacity and can be made smaller and lighter, easily. Also, oxygen has the advantage that it is not a limited resource. As just described, air batteries have many advantages and are expected to be used as batteries for portable devices, hybrid vehicles, electric vehicles, etc. Examples of air batteries include lithium-air, magnesium-air and zinc-air batteries.

An air battery comprises, for example, an air cathode layer containing an electroconductive material, catalyst and binder, an air cathode current collector for collecting current from the air cathode layer, an anode layer made of metal or alloy, an anode current collector for collecting current from the anode layer, and an electrolyte present between the air cathode and anode layers.

For example, in an air battery in which each of the migrating ions is a monovalent metal ion $M^+$, it is thought that the following charge and discharge reactions proceed:
[Upon discharge]
  Anode: $M \rightarrow M^+ + e^-$
  Cathode: $2M^+ + n/2O_2 + 2e^- \rightarrow M_2O_n$
[Upon charge]
  Anode: $M^+ + e^- \rightarrow M$
  Cathode: $M_2O_n \rightarrow 2M^+ + n/2O_2 + 2e^-$ Examples of electrolytes include non-aqueous electrolytes in which a supporting electrolyte salt is dissolved in a non-aqueous solvent such as ethylene carbonate (EC) or propylene carbonate (PC). However, non-aqueous solvents such as EC and PC are volatile and may cause electrolyte depletion during use.

In recent years, therefore, to use a low-volatile ionic liquid as the solvent of a non-aqueous electrolyte has been proposed.

For example, in Patent Literature 1, ionic liquids such as 1-methyl-3-propylimidazolium bis(trifluorosulfonyl)amide and 1-ethyl-3-butylimidazolium tetrafluoroborate are raised as the solvent of a non-aqueous ion conducting medium for air batteries.

A non-aqueous electrolyte air battery is disclosed in Patent Literature 2, in which the non-aqueous electrolyte is a room-temperature molten-salt containing a specific cation and a lithium ion. In this literature, bis(trifluoromethanesulfonyl)amide (TESA), bis(pentafluoroethanesulfonyl)amide, trifluoromethanesulfonylnonafluorobutanesulfonylamide and so on are mentioned as examples of counter ions of the cations.

An air battery is disclosed in Patent Literature 3, comprising a hydrophobic non-aqueous electrolyte containing a room-temperature molten-salt having a melting point of 60° C. or less. In this literature, trimethylpropylammonium bis(trifluoromethylsulfonyl)amide is mentioned as an example of the room-temperature molten-salt.

A lithium secondary battery comprising a non-aqueous liquid electrolyte is disclosed in Patent literature 4. It is not an air battery; however, it uses an ionic liquid as the solvent of the non-aqueous liquid electrolyte, the ionic liquid comprising bis(fluorosulfonyl)amide anion as the anion component.

CITATION LIST

Patent Literature 1: Japanese Patent Application Laid-Open (JP-A) No. 2009-230985
Patent Literature 2: JP-A No. 2004-119278
Patent Literature 3: JP-A No. 2005-116317
Patent Literature 4: JP-A No. 2007-207675

SUMMARY OF INVENTION

Technical Problem

Ionic liquids that have been used in air batteries have the advantage of low volatility. On the other hand, due to their high viscosity, they have the problem of low migrating ion conductivity (e.g., lithium ion conductivity) in the non-aqueous electrolyte. When the ion conductivity of the non-aqueous electrolyte is low, there is an increase in the internal resistance of an air battery and thus a decrease in the discharge capacity of the battery. Since the viscosity of ionic liquids decreases with decreasing temperature, there is a large decrease in discharge capacity particularly under a low operating temperature condition. A battery using a conventional ionic liquid has low ion conductivity, so that the rechargeable/dischargeable current density of the battery is low and the battery shows poor rate characteristics.

The present invention was achieved in light of the above circumstances. An object of the present invention is to provide a non-aqueous electrolyte air battery with large discharge capacity and excellent rate characteristics.

Solution to Problem

The non-aqueous electrolyte air battery of the present invention comprises an air cathode, an anode and a non-aqueous electrolyte present between the air cathode and anode, wherein the non-aqueous electrolyte comprises an ionic liquid as the solvent, the ionic liquid comprising bis(fluorosulfonyl)amide as the anion portion.

The non-aqueous electrolyte air battery of the present invention, in which the ionic liquid having the above-specified anion portion is used as the solvent of the non-aqueous electrolyte, can increase discharge capacity and rate characteristics.

As the ionic liquid, there may be mentioned an ionic liquid comprising at least one selected from the group consisting of quaternary ammonium salt, imidazolium, piperidinium and pyrrolidinium, as the cation portion.

In particular, the ionic liquid is at least one selected from the group consisting of N,N,N-trimethyl-N-propylammonium bis(fluorosulfonyl)amide, N-methyl-N-propylpiperidinium bis(fluorosulfonyl)amide and N-methyl-N-propylpyrrolidinium bis(fluorosulfonyl)amide.

Advantageous Effects of Invention

According to the present invention, it is possible to provide a non-aqueous electrolyte air battery with large discharge capacity and excellent rate characteristics.

DESCRIPTION OF EMBODIMENTS

The non-aqueous electrolyte air battery of the present invention comprises an air cathode, an anode and a non-aqueous electrolyte present between the air cathode and anode, wherein the non-aqueous electrolyte comprises an ionic liquid as the solvent, the ionic liquid comprising bis(fluorosulfonyl)amide as the anion portion.

The non-aqueous electrolyte air battery will be explained hereinafter, with reference to FIG. 1.

Figure 1:
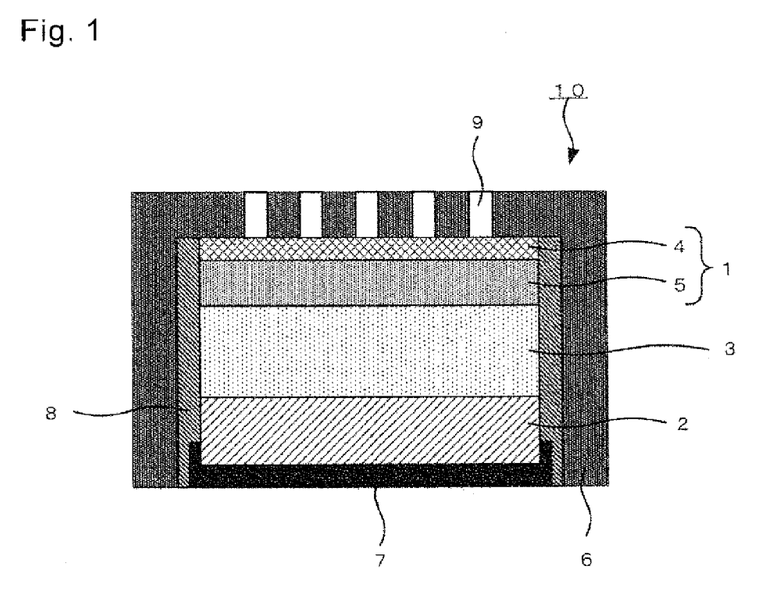
FIG. 1 is a schematic sectional view showing an embodiment example of the air battery of the present invention.

FIG. 1 shows that in an air battery 10, an air cathode (cathode) 1, an anode 2 and a non-aqueous electrolyte 3 are stored in a battery case comprising an air cathode can 6 and an anode can 7. The air cathode 1, the anode 2 and the non-aqueous electrolyte 3 are arranged so that the non-aqueous electrolyte 3 is present between the air cathode 1 and the anode 2. The air cathode can 6 and the anode can 7 are fixed by a gasket 8 to ensure the sealing properties of the battery case.

The air cathode 1 comprises an air cathode layer 5 and an air cathode current collector 4 for collecting current from the air cathode layer 5, which are stacked in this order from the non-aqueous electrolyte 3 side.

The air cathode layer 5 is an oxidation-reduction reaction site for oxygen, and it comprises an electroconductive material (e.g., carbon black), a catalyst (e.g., manganese dioxide) and a binder (e.g., polyvinylidene fluoride).

The air cathode current collector 4 is composed of a porous electroconductive material (e.g., carbon paper). In the air cathode current collector, air taken in from an air hole 9 provided in the air cathode can 6 can be supplied to the air cathode layer 5 through the air cathode current collector 4.

The anode 2 comprises an anode active material such as Li metal, which can release and absorb metal ions (migrating ions).

The non-aqueous electrolyte 3 is one in which a supporting electrolyte salt (e.g., lithium bis(trifluoromethanesulfonyl)amide) is dissolved in an ionic liquid comprising bis(fluorosulfonyl)amide (hereinafter may be referred to as FSA) as the anion portion (e.g., N-methyl-N-propylpiperidinium bis(fluorosulfonyl)amide). A separator (not shown) composed of an insulating porous material is impregnated with the non-aqueous electrolyte.

One of the main characteristics of the non-aqueous electrolyte air battery of the present invention is such that the non-aqueous electrolyte comprises the ionic liquid comprising FSA as the anion portion. As a result of diligent researches, the inventor of the present invention has found that by using the ionic liquid comprising FSA as the anion portion as the solvent of the non-aqueous electrolyte, there are a large increase in the discharge capacity of the non-aqueous electrolyte air battery and an increase in the rate characteristics of the battery.

The reason is presumed to be that by using the ionic liquid comprising FSA as the anion portion, the conductivity of the migrating ions in the non-aqueous electrolyte is increased; moreover, the solubility of oxygen into the non-aqueous electrolyte and the mobility of oxygen dissolved in the non-aqueous electrolyte are increased. Lower viscosity of the ionic liquid comprising FSA as the anion portion than those of other ionic liquids such as an ionic liquid comprising bis(trifluoromethanesulfonyl)amide (hereinafter may be referred to as TFSA) as the anion portion, is thought to be one of the primary factors behind the above-mentioned increase in the discharge capacity and rate characteristics.

As a result of researches made by the inventor, it has been also confirmed that the ionic liquid comprising FSA as the anion portion shows approximately the same capacity performance as the ionic liquid comprising TFSA as the anion portion, when it is used as the solvent of the non-aqueous electrolyte in a non-aqueous electrolyte secondary battery which does not use oxygen as the cathode active material (see Comparative Examples 4 to 6). That is, it can be said that the discharge capacity increasing effect due to the use of, as the solvent of the non-aqueous electrolyte, the ionic liquid comprising FSA as the anion portion, is an effect which is obtained specifically in the case of using oxygen as the cathode active material. The above-mentioned effect due to the use of the ionic liquid comprising FSA as the anion portion, has not been reported.

Moreover, the ionic liquid is flame-retardant and thus able to ensure air battery safety. In addition, the ionic liquid is low-volatile and less likely to cause electrolyte depletion.

In the present invention, "non-aqueous electrolyte air battery" means a battery in which oxidation-reduction reaction of the cathode active material, oxygen, is carried out in the air cathode (cathode); oxidation-reduction reaction of metal is carried out in the anode; and metal ions are conducted by the non-aqueous electrolyte present between the air cathode and the anode. Examples of air batteries include a lithium-air battery, a sodium-air battery, a potassium-air battery, a magnesium-air battery, a calcium-air battery, a zinc-air battery and an aluminum-air battery.

In the present invention, the non-aqueous electrolyte air battery can be a primary or secondary battery.

Hereinafter, the constituents of the non-aqueous electrolyte air battery of the present invention will be explained in detail.

(Non-Aqueous Electrolyte)

The non-aqueous electrolyte is one in which a supporting electrolyte salt is dissolved in a non-aqueous solvent. It is retained between the air cathode and anode, more specifically, between the air cathode and anode layers, to conduct migrating ions between the air cathode and anode.

In the present invention, the solvent (non-aqueous solvent) contains the ionic liquid comprising FSA ($[(FSO_2)_2N]^-$) as the anion portion.

In the ionic liquid, the cation portion paired with FSA is not particularly limited. For example, there may be mentioned quaternary ammonium salt, imidazolium, piperidinium, pyrrolidinium, pyridinium and pyrazolium. Of them, from the viewpoint of high resistance to reductive degradation, preferred is at least one selected from the group consisting of quaternary ammonium salt, imidazolium, piperidinium and pyrrolidinium.

Concrete examples of the quaternary ammonium include N,N,N-trimethyl-N-propylammonium (hereinafter referred to as TMPA) and N,N-diethyl-N-methyl-N-(2-methoxyethyl) ammonium (hereinafter referred to as DEME).

Examples of the imidazolium include 1-ethyl-3-methylimidazolium (hereinafter referred to as EMI), 1-allyl-3-ethylimidazolium (hereinafter referred to as AEIm) and 1,3-diallylimidazolium (hereinafter referred to as AAIm).

Examples of the piperidinium include N,N,N-trimethyl-N-propylammonium and N-methyl-N-propylpiperidinium (hereinafter referred to as PP13).

Examples of the pyrrolidinium include N-methyl-N-propylpyrrolidinium (hereinafter referred to as P13) and N-methyl-N-butylpyrrolidinium (hereinafter referred to as P14).

From the viewpoint of low viscosity and high resistance to reductive degradation, the ionic liquid comprising FSA as the anion portion is preferably at least one selected from the group consisting of N,N,N-trimethyl-N-propylammonium bis(fluorosulfonyl)amide (abbreviation: TMPA-FSA), N-methyl-N-propylpiperidinium bis(fluorosulfonyl)amide (abbreviation: PP13-FSA) and N-methyl-N-propylpyrrolidinium bis(fluorosulfonyl)amide (abbreviation: P13-FSA).

These ionic liquids comprising FSA as the anion portion may be used alone or in combination of two or more kinds.

In the present invention, as the solvent of the non-aqueous electrolyte, other non-aqueous solvent may be used in combination with the ionic liquid comprising FSA as the anion portion. However, from the viewpoint of discharge capacity and rate characteristics as described above, the rate of the ionic liquid comprising FSA as the anion portion, is preferably 70 vol % or more, more preferably 80 vol % or more, still more preferably 90 vol % or more, when all the solvent contained in the non-aqueous electrolyte is 100 vol %.

Examples of other non-aqueous solvents include cyclic carbonates such as propylene carbonate (PC), ethylene carbonate (EC) and vinylene carbonate (VC); chain carbonates such as dimethyl carbonate (DMC), ethyl methyl carbonate (EMC), diethyl carbonate (DEC) and methyl propyl carbonate; and lactones such as γ-butyrolactone and γ-valerolactone.

The ionic liquid comprising FSA as the anion portion may be used in combination with an ionic liquid in which the anion portion is other than FSA. The examples include N,N,N-trimethyl-N-propylammonium bis(trifluoromethanesulfonyl)amide (abbreviation: TMPA-TFSA), N-methyl-N-propylpiperidinium bis(trifluoromethanesulfonyl)amide (abbreviation: PP13-TFSA), N-methyl-N-propylpyrrolidinium bis(trifluoromethanesulfonyl)amide (abbreviation: P13-TFSA), N-methyl-N-butylpyrrolidinium bis(trifluoromethanesulfonyl)amide (abbreviation: P14-TFSA), N,N-diethyl-N-methyl-N-(2-methoxyethyl)ammonium bis(trifluoromethanesulfonyl)amide (abbreviation: DEME-TFSA), 1-methyl-3-ethylimidazolium tetrafluoroborate (abbreviation: EMIBF$_4$) 1-methyl-3-ethylimidazolium bis(trifluoromethanesulfonyl)amide (abbreviation: EMITFSA), 1-allyl-3-ethylimidazolium bromide (abbreviation: AEImBr), 1-allyl-3-ethylimidazolium tetrafluoroborate (abbreviation: AEImBF$_4$), 1-allyl-3-ethylimidazolium bis(trifluoromethanesulfonyl)amide (abbreviation: AEImTFSA), 1,3-diallylimidazolium bromide (abbreviation: AAImBr), 1,3-diallylimidazolium tetrafluoroborate (abbreviation: AAImBE$_4$) and 1,3-diallylimidazolium bis(trifluoromethanesulfonyl)amide (abbreviation: AEImTFSA).

The supporting electrolyte salt is not particularly limited as long as it is soluble in non-aqueous solvents and can exert desired ion conductivity. In general, there may be used a metal salt containing a metal ion desired to be conducted. For example, in the case of lithium-air battery, there may be used a lithium salt as the supporting electrolyte salt. The examples include inorganic lithium salts such as LiPF$_6$, LiBF$_4$, LiClO$_4$, LiAsF$_6$, LiOH, LiCl, LiNO$_3$ and Li$_2$SO$_4$. Also, there may be used an organic lithium salt such as CH$_3$CO$_2$Li, lithium bis (oxalate)borate (abbreviation: LiBOB), LiN(FSO$_2$)$_2$ (abbreviation: LiFSA), LiN(CF$_3$SO$_2$)$_2$ (abbreviation: LiTFSA), LiN(C$_2$F$_5$SO$_2$)$_2$ (abbreviation: LiBETA) and LiN(CF$_3$SO$_2$)(C$_4$F$_9$SO$_2$).

Examples of supporting electrolyte salts of metal-air batteries other than lithium, include NaClO$_3$, NaPF$_6$, NaTFSA, KClO$_4$, KTFSA, Mg(ClO$_4$)$_2$, Mg(TFSA)$_2$, Mg(PF$_6$)$_2$, Ca(PF$_6$)$_2$, Ca(ClO$_4$)$_2$, Ca(TFSA)$_2$ and Al(TFSA)$_3$.

In the non-aqueous electrolyte, the content of the supporting electrolyte salt relative to the non-aqueous solvent, is not particularly limited. For example, the content is preferably 0.01 to 3 mol/L, particularly preferably 0.1 to 2.5 mol/L, still more preferably 0.5 to 2 mol/L.

The non-aqueous electrolyte may be used in such a manner that an insulating porous material is impregnated with the non-aqueous electrolyte and the impregnated insulating porous material is provided between the air cathode and anode. Examples of insulating porous materials include porous membranes of polyethylene, polypropylene, etc., and non-woven fabrics such as a resin non-woven fabric and a glass fiber non-woven fabric. The insulating porous material also functions as a separator between the air cathode and anode.

The non-aqueous electrolyte may be used in the form of gel, by adding a polymer such as polyethylene oxide (PEO), polyacrylonitrile (PAN) or polymethyl methacrylate (PMMA). However, from the viewpoint of ion conductivity of the non-aqueous electrolyte, it is preferable that the non-aqueous electrolyte is used without gelation.

(Air Cathode)

The air cathode comprises at least an electroconductive material and functions as an oxidation-reduction reaction site for oxygen. The air cathode generally comprises an air cathode layer composed of an air cathode composite material comprising, in addition to the electroconductive material, a catalyst, a binder, etc. In the air cathode layer, supplied oxygen reacts with metal ions conducted from the anode to produce a metal oxide on the surface of the electroconductive material. The air cathode layer is generally porous and ensures diffusivity of oxygen, which is an active material.

The electroconductive material is not particularly limited as long as it is electrically-conductive, and one of the examples is a carbonaceous material. There is no particular limitation on the carbonaceous material; however, it is preferably one with a high specific surface area, from the viewpoint of the area or space of the reaction site in which the metal oxide is produced.

In particular, the carbonaceous material preferably has a specific surface area of 10 m$^2$/g or more, particularly preferably 100 m$^2$/g or more, still more preferably 600 m$^2$/g or more. Examples of carbonaceous materials with a high specific surface area include carbon black, activated carbon, carbon fibers (e.g., carbon nanotubes, carbon nanofibers) and graphite. The specific surface area of the electroconductive material can be measured by the BET method, for example.

In the air cathode layer, the content of the electroconductive material varies depending on the density, specific surface area, etc. However, for example, it is preferably in the range of 10 to 90% by weight, particularly preferably 10 to 50% by weight.

The binder is not particularly limited, and the examples include those that can be used in lithium-ion batteries, etc. Concrete examples include polyvinylidene fluoride (PVDF), polytetrafluoroethylene (PTFE) and styrene-butadiene rubber (SBR). Also, there may be used gel polymers such as polyvinylidene fluoride-hexafluoropropylene copolymer (PVdF-HFP), polyacrylate, polyethylene oxide and polymethacrylate. Gel polymers have binding properties and liquid retention properties, so that they are effective in preventing the non-aqueous electrolyte from leakage, in addition to fixing the electroconductive material and catalyst.

In the air cathode layer, for example, the content of the binder is preferably 5 to 50% by weight, particularly preferably 10 to 30% by weight.

As the catalyst, there may be mentioned on which can promote the oxidation-reduction reaction of oxygen in the air cathode. The catalyst may be supported by the electroconductive material.

Concrete examples of the catalyst include phthalocyanine compounds such as cobalt phthalocyanine, manganese phthalocyanine, nickel phthalocyanine, tin phthalocyanine oxide, titanium phtalocyanine and dilithium phthalocyanine; naphthocyanine compounds such as cobalt naphthocyanine; macrocyclic complexes such as iron porphyrin; macrocyclic complexes (such as iron porphyrin) coordinated with transition metal; inorganic oxides such as $MnO_2$, $CeO_2$, $Co_3O_4$, NiO, $V_2O_5$, $Fe_2O_3$, ZnO, CuO, $LiMnO_2$, $Li_2MnO_3$, $LiMn_2O_4$, $Li_4Ti_5O_{12}$, $Li_2TiO_3$, $LiNi_{1/3}Co_{1/3}Mn_{2/3}O_2$, $LiNiO_2$, $LiVO_3$, $Li_5FeO_4$, $LiFeO_2$, $LiCrO_2$, $LiCoO_2$, $LiCuO_2$, $LiZnO_2$, $Li_2MoO_4$, $LiNbO_3$, $LiTaO_3$, $Li_2WO_4$, $Li_2ZrO_3$, $NaMnO_2$, $CaMnO_3$, $CaFeO_3$, $MgTiO_3$ and $KMnO_2$; and noble metals such as Pt, Au, Ag, Pd, Ru and Ir.

In the air cathode layer, the content of the catalyst is not particularly limited. However, it is preferably in the range of 1 to 90% by weight, for example.

In addition to the air cathode layer, the air cathode may further comprise an air cathode current collector for collecting current from the air cathode layer.

The air cathode current collector may be porous or dense as long as it has desired electron conductivity. From the viewpoint of air (oxygen) diffusivity, it is preferably porous.

In the case of using a porous current collector as the air cathode current collector, the air cathode current collector can be provided inside the air cathode layer, unlike FIG. 1 in which the air cathode layer and the air cathode current collector are stacked (next to each other). When the air cathode current collector is provided inside the air cathode layer, an effect of increasing the efficiency of current collection from the air cathode, can be expected.

As the material for the air cathode current collector, for example, there may be mentioned non-metallic materials such as highly electron-conductive ceramic materials including carbonaceous materials and titanium nitride. Particularly preferred is a current collector comprising a carbonaceous material such as carbon paper, non-woven carbon fabric and carbon cloth. This is because, when a strong alkaline metal oxide is produced by a discharge reaction in the air cathode, it is possible to prevent the porous current collector from elution and to prevent a reduction in battery performance, which is attributed to the elution.

The thickness of the air cathode current collector is not particularly limited. For example, it is preferably 10 to 1,000 μm, particularly preferably 20 to 400 μm.

The below-described battery case can also function as the current collector of the air cathode.

The thickness of the air cathode layer varies depending on the intended use of the air battery, etc. For example, is preferably in the range of 2 to 500 μm, particularly preferably in the range of 5 to 300 μm.

The method for producing the air cathode is not particularly limited. For example, the air cathode can be produced by a method in which the electroconductive material, binder and catalyst are mixed with the solvent to prepare an air cathode composite material paste and the paste is applied and dried. As needed, pressing or heating may be carried out after the drying of the paste.

By applying the air cathode composite material paste to the surface of the air cathode current collector and drying the applied paste, the air cathode in which the air cathode layer and the air cathode current collector are stacked, can be produced. Or, the air cathode can be obtained by a method in which the air cathode current collector and the air cathode layer obtained by applying and drying the air cathode composite material paste, are stacked and then pressed or heated appropriately.

The solvent of the air cathode composite material paste is not particularly limited as long as it is volatile. Concrete examples thereof include water and organic solvents such as acetone, N,N-dimethylformamide (DMF), N-methyl-2-pyrrolidone (NMP) and N,N-dimethylacetamide (DMA). A solvent having a boiling point of 200° C. or less is preferred, since it facilitates drying of the air cathode composite material paste.

The method for applying the air cathode material mixture is not particularly limited, and there may be used general methods such as the doctor blade method and the spray method.

(Anode)

The anode comprises an anode active material which can release and absorb metal ions (migrating ions). Concrete examples of the structure of the anode include a single layer structure composed of an anode layer comprising an anode active material, and a multi-layer structure composed of an anode layer and an anode current collector for collecting current from the anode layer.

The anode active material is not particularly limited as long as it can release and absorb migrating ions. The examples include elemental metals, alloys, metal oxides, metal sulfides and metal nitrides, all of which comprise metal ions (migrating ions). Also, carbonaceous materials can be used as the anode active material. Preferred as the anode active material are elemental metals or alloys, and particularly preferred are elemental metals. In particular, as the elemental metal, there may be mentioned at least one elemental metal selected from the group consisting of lithium, sodium, potassium, magnesium, calcium and aluminum, for example.

Concrete examples of anode active materials for lithium-air batteries include lithium metal; lithium alloys such as lithium-aluminum alloy, lithium-tin alloy, lithium-lead alloy and lithium-silicon alloy; metal oxides such as tin oxide, silicon oxide, lithium-titanium oxide, niobium oxide and tungsten oxide; metal sulfides such as tin sulfide and titanium sulfide; metal nitrides such as lithium-cobalt nitride, lithium-iron nitride and lithium-manganese nitride; and carbonaceous materials such as graphite. Of them, preferred are lithium metal and carbonaceous materials. From the viewpoint of higher capacity, more preferred is lithium metal.

The anode layer is just needed to comprise at least the anode active material. However, as needed, it can also comprise a binder for fixing the anode active material. For example, in the case of using a metal or alloy foil as the anode active material, the anode layer can be in the form of containing the anode active material only. In the case of using a powdery anode active material, the anode layer can be in the form of containing the anode active material and the binder.

Also, the anode layer may comprise an electroconductive material. The type and amount of the binder and electroconductive material used are the same as those of the above-described air cathode, so that they are not explained here.

The material for the anode current collector is not particularly limited as long as it is electrically-conductive. The examples include copper, stainless-steel and nickel. As the form of the anode current collector, there may be mentioned a foil form, a plate form and a mesh form. The battery case can also function as the anode current collector.

The method for producing the anode is not particularly limited. For example, there may be a method in which the anode active material in the form of foil and the anode current collector are stacked and pressed. Or, there may be mentioned a different method in which an anode material mixture comprising the anode active material and the binder is prepared, and the mixture is applied onto the anode current collector and dried.

(Others)

A metal-air battery generally comprises a battery case for housing the air cathode, the anode and the non-aqueous electrolyte. The form of the battery case is not particularly limited; however, concrete examples thereof include a coin form, a flat plate form, a cylinder form and a laminate form. The battery case can be an open-to-the-atmosphere battery case or a closed battery case. The open battery case is has such a structure that at least the air cathode can be sufficiently exposed to oxygen. On the other hand, the closed battery case can be provided with gas inlet and outlet tubes, the gas containing oxygen, which is a cathode active material. It is preferable that the introduced gas has a high oxygen concentration. It is particularly preferable that the introduced gas is pure oxygen.

Each of the air cathode current collector and the anode current collector can be provided with a terminal, which functions as a connection to the outside.

Besides the stacked form shown in FIG. 1, the air battery of the present invention can be in the form of a wound type battery.

The method for producing the metal-air battery of the present invention is not particularly limited and can be selected from general methods.

The air battery of the present invention shows excellent discharge properties at relatively low temperature such as room temperature (e.g., 20 to 25° C.).

EXAMPLES

Example 1

(Production of Non-Aqueous Electrolyte Air Battery)

Figure 2:
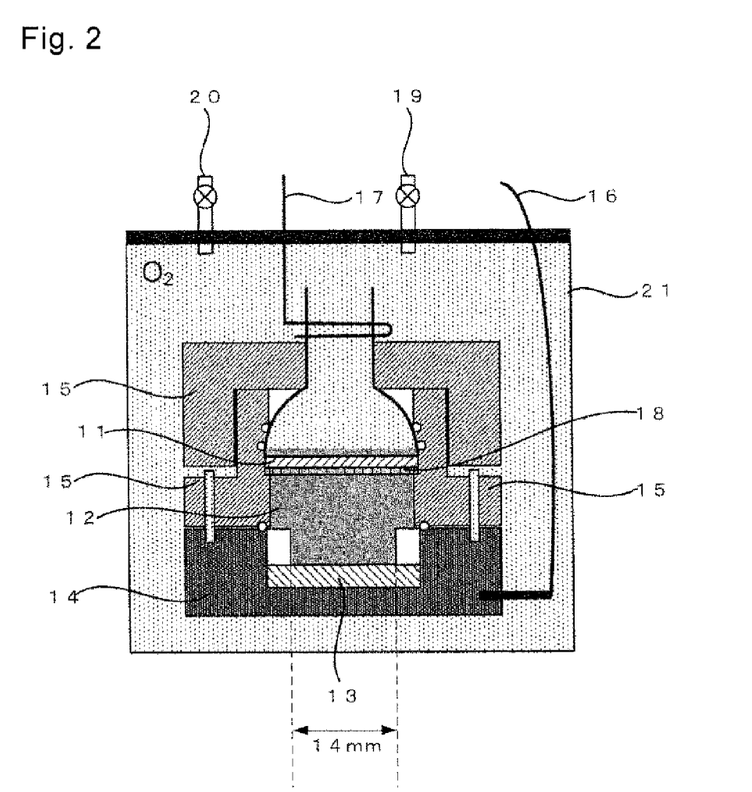
FIG. 2 is a schematic sectional view of the air battery cell used in Examples 1 to 3 and Comparative Examples 1 to 3.

A non-aqueous electrolyte air battery cell was produced, which is shown in FIG. 2. FIG. 2 is a schematic sectional view of the non-aqueous electrolyte air battery cell. White circles shown in FIG. 2 mean packings for retaining air-tightness.

The battery production was all carried out inside an argon box (dew point −40° C. or less).

An air cathode 11 was produced as follows. First, 85 parts by weight of Ketjen Black (manufactured by Ketjen Black International Company), 15 parts by weight of electrolytic manganese dioxide (manufactured by Kojundo Chemical Laboratory Co., Ltd.), 100 parts by weight of a PVdF solution (manufactured by Kureha Corporation, PVdF concentration 12 wt %) and 100 parts by weight of N-methylpyrrolidone (manufactured by Kanto Chemical Co., Inc.) were mixed in a polypropylene container. Then, the mixture was further mixed with a kneader to prepare an air cathode paste. Next, the air cathode paste was applied onto a carbon paper (TGP-H-090 manufactured by Toray Industries, Inc., thickness 0.28 mm). The N-methylpyrrolidone was evaporated and dried to produce an air cathode sheet. The air cathode sheet was cut into an 18-mm diameter piece to produce the air cathode 11.

A lithium metal foil (manufactured by Kyokuto Kinzoku Ltd., thickness 200 μm, diameter 19 mm) was used as an anode 13.

As shown in FIG. 2, inside a housing comprising a stainless-steel jig 14 and a Teflon (trade name) member 15 (F-type cell manufactured by Hokuto Denko Corporation), the air cathode 11 and the anode 13 were arranged so that a 14-mm diameter region on the air cathode 11 and that on the anode 13 faced each other via a non-aqueous electrolyte 12.

As the non-aqueous electrolyte 12, $LiN(SO_2CF_3)_2$ (abbreviation: Li-TFSA) dissolved in TMPA-FSA was used (Li-TFSA concentration 1 mol/L). A separator 9 (made of polyethylene, manufactured by Celgard Inc.) was put on a surface of the air cathode 11 and impregnated with the non-aqueous electrolyte 12.

Also, an anode lead 16 was connected to the anode 13, while an air cathode lead 17 was connected to the air cathode 11.

The whole cell was put in a glass container 21 (internal volume 1,000 cc) provided with an oxygen gas outlet tube 19 and an oxygen gas inlet tube 20. Then, the container was hermetically sealed. The non-aqueous electrolyte air battery cell thus produced has such a structure that oxygen gas introduced in the glass container 21 through the oxygen gas inlet tube 20 can be supplied to a surface of the air cathode 11, which is opposite to the surface facing the anode 13.

(Battery Test)

The glass container housing the above-produced non-aqueous electrolyte air battery cell was taken from the argon box. Then, oxygen gas was supplied to the inside of the glass container from a cylinder for 3 minutes through the oxygen gas inlet tube, thereby replacing the atmosphere inside the container with the oxygen gas.

Then, the glass container housing the non-aqueous electrolyte air battery cell was put in a thermostat at 25° C. A charge-discharge test was performed thereon, by the following method. First, the cell was discharged at a current density of 0.2 mA/cm². The end-of-discharge voltage was set to 2V. Next, following the discharge and then a one-hour pause, the cell was charged at a current density of 0.2 mA/cm². The end-of-charge voltage was set to 4.1 V. The discharge and charge was counted as 1 cycle (including the one-hour pause between the discharge and charge) and several discharge-charge cycles were carried out.

Figure 3:
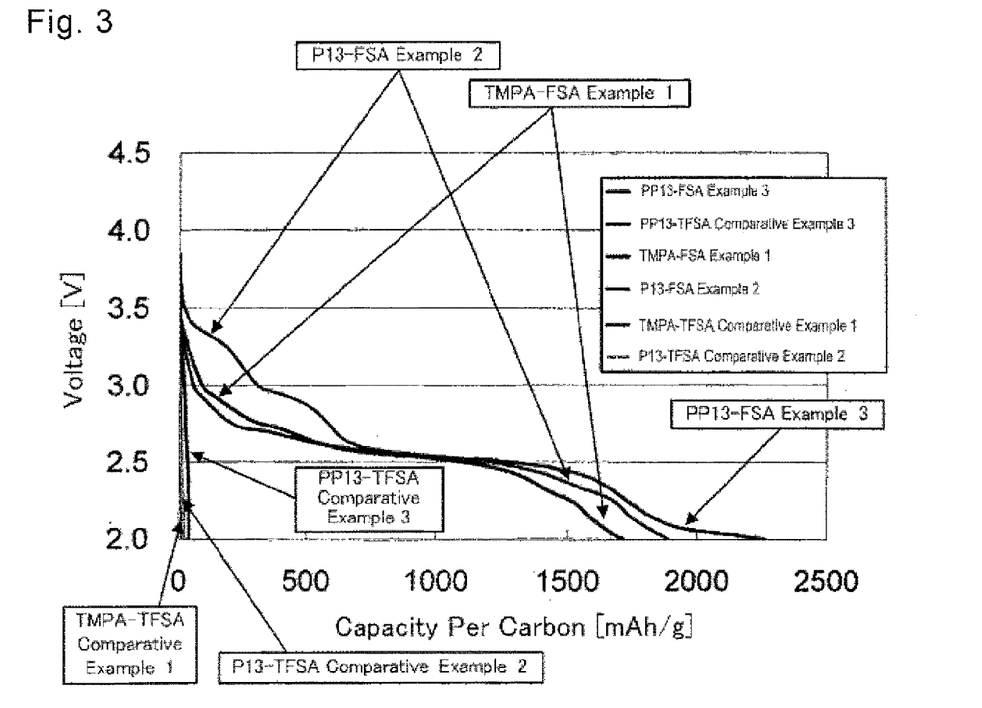
FIG. 3 shows the discharge curves of Examples 1 to 3 and Comparative Examples 1 to 3.

The discharge capacity at the third cycle is shown in Table 1. The discharge curve at the third cycle is shown in FIG. 3. In Table 1, "mAh/g-C" means the discharge capacity per weight of the carbon (Ketjen Black) in the air cathode.

Example 2

A non-aqueous electrolyte air battery was produced in the same manner as Example 1, except that the non-aqueous electrolyte was prepared by using P13-FSA, in place of TMPA-FSA. The thus-produced battery was also tested in the same manner as Example 1.

The results are shown in Table 1 and FIG. 3.

Example 3

A non-aqueous electrolyte air battery was produced in the same manner as Example 1, except that the non-aqueous electrolyte was prepared by using PP13-FSA, in place of TMPA-FSA. The thus-produced battery was also tested in the same manner as Example 1.

The results are shown in Table 1 and FIG. 3.

Comparative Example 1

A non-aqueous electrolyte air battery was produced in the same manner as Example 1, except that the non-aqueous electrolyte was prepared by using TMPA-TFSA, in place of TMPA-FSA. The thus-produced battery was also tested in the same manner as Example 1.

The results are shown in Table 1 and FIG. 3.

Comparative Example 2

A non-aqueous electrolyte air battery was produced in the same manner as Example 1, except that the non-aqueous electrolyte was prepared by using P13-TFSA, in place of TMPA-FSA. The thus-produced battery was also tested in the same manner as Example 1.

The results are shown in Table 1 and FIG. 3.

Comparative Example 3

A non-aqueous electrolyte air battery was produced in the same manner as Example 1, except that the non-aqueous electrolyte was prepared by using PP13-TFSA, in place of TMPA-FSA. The thus-produced battery was also tested in the same manner as Example 1.

The results are shown in Table 1 and FIG. 3.

Comparative Example 4

(Production of Non-Aqueous Electrolyte Lithium Ion Secondary Battery)

The battery production was all carried out in an argon box (dew point −40° C. or less).

First, the following materials were mixed to prepare a cathode paste: 100 parts by weight of $LiNi_{1/3}Co_{1/3}Mn_{1/3}O$ (manufactured by Nichia Corporation), which is an active material; 3 parts by weight of acetylene black (manufactured by Denki Kagaku Kogyo Kabushiki Kaisha), which is an electroconductive material; 5 parts by weight of PVdF (manufactured by Kureha Corporation), which is a binder; and 40 parts by weight of N-methylpyrrolidone (manufactured by Kanto Chemical Co., Inc.) Next, the cathode paste was applied onto an aluminum foil (manufactured by Mitsubishi Materials Corporation, thickness 10 μm) and dried to prepare a cathode sheet.

The following materials were mixed to produce an anode paste: 100 parts by weight of $Li_4Ti_5O_{12}$ (manufactured by Ishihara Sangyo Kaisha, Ltd.), which is an active material; 10 parts by weight of acetylene black (manufactured by Denki Kagaku Kogyo Kabushiki Kaisha), which is an electroconductive material; 10 parts by weight of PVdF (manufactured by Kureha Corporation), which is a binder; and 40 parts by weight of N-methylpyrrolidone (manufactured by Kanto Chemical Co., Inc.) Next, the anode paste was applied onto a nickel foil (manufactured by Fukuda Metal Foil & Powder Co., Ltd., thickness 10 μm) and dried to produce an anode sheet.

The cathode sheet, a separator (Celgard Inc., thickness 20 μm) and the anode sheet were stacked in this sequence and wound to produce a 18650 cylindrical battery cell. A non-aqueous electrolyte in which Li-TFSA was dissolved in EMI-FSA (Li-TFSA concentration: 1.2 mol/L), was used.

(Battery Test)

In the following condition, charge-discharge tests were performed on the 18650 cylindrical battery cell. The results are shown in Table 2 and FIG. 4.

Figure 4:
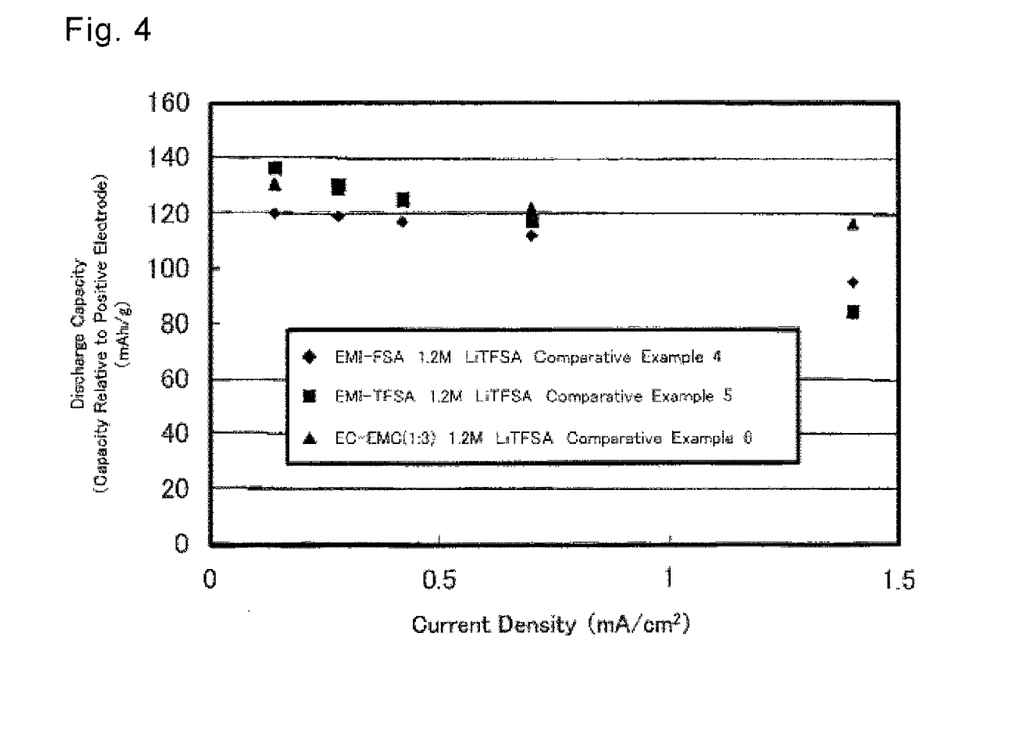
FIG. 4 is a graph showing the discharge capacities of Comparative Examples 4 to 6.

The discharge capacities shown in Table 2 and FIG. 4 are each an average (n=3) of the results of the charge-discharge tests performed three times. Also, the discharge capacities shown in Table 2 and FIG. 4 are each a discharge capacity per weight of the cathode active material (capacity relative to cathode).

<Test Condition>

Current density: 0.14 $mA/cm^2$, 0.28 $mA/cm^2$, 0.42 $mA/cm^2$, 0.7 $mA/cm^2$, 1.4 $mA/cm^2$ Temperature: 25° C.

Comparative Example 5

A non-aqueous electrolyte lithium ion secondary battery was produced in the same manner as Comparative Example 4, except that the non-aqueous electrolyte was prepared by using EMI-TFSA, in place of EMI-FSA. The thus-produced battery was also tested in the same manner as Comparative Example 4.

The results are shown in Table 2 and FIG. 4.

Comparative Example 6

A non-aqueous electrolyte lithium ion secondary battery was produced in the same manner as Comparative Example 4, except that the non-aqueous electrolyte was prepared by using a mixture of ethylene carbonate (EC) and ethyl methyl carbonate (EMC) (volume ratio EC:EMC=1:3), in place of EMI-FSA. The thus-produced battery was also tested in the same manner as Comparative Example 4.

The results are shown in Table 2 and FIG. 4.

[Results]

Hereinafter, the test results of the batteries of Examples and Comparative Examples will be explained.

TABLE 1

| | Solvent | Discharge Capacity (mAh/g-C) |
|---|---|---|
| Example 1 | TMPA-FSA | 1,714 |
| Example 2 | P13-FSA | 1,890 |
| Example 3 | PP13-FSA | 2,262 |
| Comparative Example 1 | TMPA-TFSA | 14 |
| Comparative Example 2 | P13-TFSA | 22 |
| Comparative Example 3 | PP13-TFSA | 41 |

TABLE 2

| | Discharge Capacity Relative to Cathode (mAh/g-cathode active material) | | |
|---|---|---|---|
| Current Density ($mA/cm^2$) | Comparative Example 4 (EMI-FSA) | Comparative Example 5 (EMI-TFSA) | Comparative Example 6 (EC-EMC) |
| 0.14 | 119.9 | 136.3 | 130.7 |
| 0.28 | 118.9 | 130.5 | 128.5 |
| 0.42 | 116.8 | 124.8 | 125.7 |
| 0.7 | 112.2 | 117.3 | 122.2 |
| 1.4 | 95.5 | 84.9 | 116.9 |

As shown in Table 1 and FIG. 3, a large increase is found in the discharge capacity properties of Examples 1 to 3, as a result of a comparison between the non-aqueous electrolyte air batteries of Examples 1 to 3 and Comparative Examples 1 to 3, all of which used oxygen as the cathode active material. In particular, the non-aqueous electrolyte air batteries of Examples 1 to 3 showed a discharge capacity of 1,714 to 2,262 mAh/g-C, while the non-aqueous electrolyte air batteries of Comparative Examples 1 to 3 showed a discharge capacity of 14 to 41 mAh/g-C.

On the other hand, as shown in Table 2 and FIG. 4, as a result of a comparison between the non-aqueous electrolyte lithium ion secondary batteries of Comparative Examples 4 to 6, all of which did not use oxygen as the cathode active material, these batteries showed similar results in the discharge capacity properties. Even in a comparison between Comparative Examples 4 and 5, the former using the ionic liquid comprising FSA (EMI-FSA) as the anion portion and the latter using the ionic liquid comprising TFSA (EMI-TFSA) as the anion portion, the difference as shown in the comparison of Examples 1 to 3 and Comparative Examples 1 to 3, was not found. In particular, at a current density of at least 0.7 mA/cm$^2$ or less, Comparative Example 5 using the ionic liquid comprising TFSA as the anion portion, showed a higher discharge capacity than Comparative Example 4 using the ionic liquid comprising FSA as the anion portion.

It is clear from the above results that in the air battery which uses oxygen as the cathode active material, the ionic liquid comprising FSA as the anion portion can significantly increase the discharge capacity.

The reason is assumed as follows: in the ionic liquids used as the solvent of the non-aqueous electrolyte in Comparative Examples 1 to 3, the anion portion is TFSA; meanwhile, in the ionic liquids used as the solvent of the non-aqueous electrolyte in Examples 1 to 3, the anion portion is FSA, and compared to Comparative Examples 1 to 3, the non-aqueous electrolytes used in Examples 1 to 3 had low viscosity. It is thought that due to the low viscosity of the non-aqueous electrolyte, there was an increase in the lithium ion conductivity of the non-aqueous electrolyte, resulting in a decrease in the internal resistance of the battery. Furthermore, in the secondary batteries of Comparative Examples 4 to 6, which do not use oxygen as the cathode active material, there is no large difference in discharge capacity between the case of using the non-aqueous electrolyte comprising the ionic liquid comprising ESA as the anion portion (Comparative Example 4) and the case of using the non-aqueous electrolyte comprising the ionic liquid comprising TFSA as the anion portion (Comparative Example 5). Therefore, it is thought that due to the use of the low-viscosity non-aqueous electrolyte, there was an increase in the solubility of oxygen in the non-aqueous electrolyte and thus an increase in the mobility of the oxygen dissolved in the non-aqueous electrolyte, resulting in a decrease in the internal resistance of the battery.

In the case of the air battery as those of Comparative Examples 1 to 3 and Examples 1 to 3, which uses oxygen as the cathode active material, dissolution of oxygen in the non-aqueous liquid electrolyte on the air cathode or dispersion (movement) of the dissolved oxygen is presumed to be a reaction rate-limiting process. In this case, effects of the non-aqueous electrolyte viscosity on the dissolution or dispersion of oxygen, has a large influence. That is, in the low-viscosity ionic liquid, oxygen dissolution and movement is performed quickly. Therefore, it is thought that in the air battery, a remarkable discharge capacity-increasing effect as that of the above-mentioned Examples, can be obtained in the case of using the ionic liquid comprising FSA as the anion portion (Examples 1 to 3), compared with the case of using the ionic liquid comprising TFSA as the anion portion (Comparative Examples 1 to 3). On the other hand, in a general, closed-type lithium ion secondary battery as those of Comparative Examples 4 to 6, which does not use oxygen as the cathode active material, lithium ion movement in the non-aqueous liquid electrolyte is presumed to be rate-limiting when the current density is high. In this case, the viscosity of the liquid electrolyte has a large influence, and it is clear from a comparison between the ionic liquids that the ionic liquid comprising FSA as the anion portion (Comparative Example 4) shows higher discharge performance than the ionic liquid comprising TFSA as the anion portion (Comparative Example 5). The EC-EMC has lower viscosity than the ionic liquid comprising ESA as the anion portion, so that Comparative Example 6 showed a much higher discharge capacity. It is thought that when the current density is low, the rate-limiting process is presumed to be a reaction on the electrode surface, so that the capacitance characteristic was significantly influenced by a factor which is other than the influence of the viscosity (and is not clear at this point) and the ionic liquid comprising TFSA as the anion portion showed better capacitance characteristic than the ionic liquid comprising FSA as the anion portion.

The above battery tests were performed in the temperature condition of 25° C.; therefore, it can be said that the non-aqueous electrolyte air battery of the present invention shows high discharge capacity in the room temperature range, which is expected as an air battery operating environment.

Moreover, in Examples 1 to 3, the battery test was carried out at the relatively high current density condition of 0.2 mA/cm$^2$; therefore, it can be said that the non-aqueous electrolyte air batteries of Examples 1 to 3 have excellent rate characteristics.

REFERENCE SIGNS LIST

1. Air cathode
2. Anode
3. Non-aqueous electrolyte
4. Air cathode current collector
5. Air cathode layer
6. Air cathode can
7. Anode can
8. Gasket
9. Air hole
10. Air battery
11. Air cathode
12. Electrolyte layer
13. Anode
14. Stainless steel housing
15. Teflon (trade name) housing
16. Anode lead
17. Air cathode lead
18. Separator
19. Oxygen gas outlet tube
20. Oxygen gas inlet tube
21. Glass container

The invention claimed is:
1. A non-aqueous electrolyte air battery comprising:
an air cathode;
an anode; and
a non-aqueous electrolyte present between the air cathode and anode,
wherein:
the non-aqueous electrolyte comprises, as a solvent, at least one selected from the group consisting of the following ionic liquids, each comprising bis(fluorosulfonyl)amide as an anion portion:
N,N,N-trimethyl-N-propylammonium bis(fluorosulfonyl)amide,
N-methyl-N-propylpiperidinium bis(fluorosulfonyl)amide, and
N-methyl-N-propylpyrrolidinium bis(fluorosulfonyl)amide, and
the non-aqueous electrolyte air battery has a discharge capacity of 1,714 to 2,262 mAh/g-C.

* * * * *